(12) United States Patent
Kim

(10) Patent No.: US 10,174,687 B2
(45) Date of Patent: Jan. 8, 2019

(54) METHOD OF CONTROLLING ENGINE

(71) Applicants: Hyundai Motor Company, Seoul (KR); Kia Motors Corporation, Seoul (KR)

(72) Inventor: Seung-Bum Kim, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/624,983

(22) Filed: Jun. 16, 2017

(65) Prior Publication Data
US 2018/0187613 A1 Jul. 5, 2018

(30) Foreign Application Priority Data
Jan. 4, 2017 (KR) .................. 10-2017-0001496

(51) Int. Cl.
 *F02D 11/10* (2006.01)
 *F02D 13/02* (2006.01)
 *F02D 41/00* (2006.01)
 *F02D 41/14* (2006.01)

(52) U.S. Cl.
 CPC ..... *F02D 41/0002* (2013.01); *F02D 13/0234* (2013.01); *F02D 2041/001* (2013.01); *F02D 2041/002* (2013.01); *F02D 2041/1409* (2013.01); *F02D 2200/1002* (2013.01)

(58) Field of Classification Search
 CPC .......... F02D 41/0002; F02D 41/26; F02D 2041/002; F02D 2041/001; F02D 13/0234; F02D 11/10; F02D 11/105; F02D 2200/1002; F02D 2011/102; F02D 2250/18

USPC ............... 123/399, 90.15; 701/103, 110
See application file for complete search history.

(56) References Cited

U.S. PATENT DOCUMENTS

| | | | | |
|---|---|---|---|---|
| 6,920,852 B2* | 7/2005 | Machida | ............ | F01L 13/0063 123/90.15 |
| 7,363,893 B2* | 4/2008 | Rohe | ............... | F01L 1/024 123/90.15 |
| 7,409,934 B2* | 8/2008 | Lee | ............... | F01L 1/024 123/90.16 |
| 7,412,322 B1* | 8/2008 | Rask | ............... | F02B 17/005 123/295 |

(Continued)

FOREIGN PATENT DOCUMENTS

| | | |
|---|---|---|
| DE | 10 2012 222 092 A1 | 6/2014 |
| JP | 2004-116399 | 4/2004 |

(Continued)

*Primary Examiner* — Hai Huynh
(74) *Attorney, Agent, or Firm* — Morgan, Lewis & Bockius LLP

(57) ABSTRACT

A method of controlling an engine which has a continuous variable valve duration (CVVD) device that controls an operation of opening or closing an intake valve, and an ETC device that controls an operation of opening or closing a throttle valve and adjusts the amount of air to be introduced into a combustion chamber, may include determining whether it is necessary to increase or decrease engine torque; changing a duration of the intake valve by using the CVVD device when it is necessary to increase or decrease the engine torque; and adjusting the amount of air introduced through the ETC device in a state in which the duration of the intake valve is changed.

5 Claims, 2 Drawing Sheets

(56) References Cited

U.S. PATENT DOCUMENTS

| | | | | |
|---|---|---|---|---|
| 8,578,898 B1* | 11/2013 | Braman | ............... | F01L 1/185 123/90.16 |
| 9,759,137 B2* | 9/2017 | Kawaguchi | ............. | F01L 1/267 |
| 2003/0121484 A1* | 7/2003 | Wang | ............... | F01L 1/18 123/90.16 |
| 2003/0127063 A1* | 7/2003 | Wang | ............... | F01L 1/18 123/90.16 |
| 2004/0050353 A1* | 3/2004 | Williams | ............... | F01L 1/047 123/90.18 |
| 2004/0055548 A1* | 3/2004 | Williams | ............... | F01L 1/022 123/90.15 |
| 2004/0112331 A1* | 6/2004 | Miura | ............... | F01L 1/022 123/346 |
| 2006/0090728 A1* | 5/2006 | Arinaga | ............. | F02D 13/0207 123/339.19 |
| 2006/0174854 A1* | 8/2006 | Yoshizawa | .......... | F01L 13/0021 123/348 |
| 2007/0039579 A1* | 2/2007 | Fuwa | ............... | F02D 13/023 123/90.16 |
| 2007/0227479 A1* | 10/2007 | Fuwa | ............... | F01L 1/34 123/90.16 |
| 2008/0283006 A1* | 11/2008 | Sutherland | .......... | F01L 13/0015 123/90.15 |
| 2009/0048764 A1* | 2/2009 | Fuwa | ............... | F01L 1/34 701/105 |
| 2009/0229565 A1* | 9/2009 | Kang | ............... | F01L 1/344 123/295 |
| 2010/0109847 A1* | 5/2010 | Noel | ............... | G06K 7/0008 340/10.2 |
| 2010/0222985 A1* | 9/2010 | Yun | ............... | F02D 37/02 701/103 |
| 2014/0048026 A1* | 2/2014 | Miyazato | ............ | F02D 13/0238 123/90.15 |
| 2016/0195031 A1* | 7/2016 | Willems | .............. | F02D 41/0087 123/52.1 |
| 2016/0208732 A1* | 7/2016 | Mori | ................ | F02D 41/0072 |

FOREIGN PATENT DOCUMENTS

| | | |
|---|---|---|
| JP | 2004-124743 | 4/2004 |
| JP | 4172319 B2 | 10/2008 |
| JP | 2010-084599 | 4/2010 |
| JP | 5104948 B2 | 12/2012 |
| KR | 20-1999-0039953 U | 11/1999 |
| KR | 10-1511959 B1 | 4/2015 |
| WO | WO 2005/047692 A1 | 5/2005 |

\* cited by examiner

METHOD OF CONTROLLING ENGINE

CROSS-REFERENCE(S) TO RELATED APPLICATIONS

The present application claims priority to Korean Patent Application No. 10-2017-0001496, filed on Jan. 4, 2017, the entire contents of which is incorporated herein for all purposes by this reference.

BACKGROUND OF THE INVENTION

Field of the Invention

The present invention relates to a method of controlling an engine for a vehicle, and more particularly, to a method of controlling an engine which is capable of improving fuel economy by quickly and actively controlling the engine in accordance with various driving situation conditions of the engine and vehicle. The present case is achieved by utilizing a continuous variable valve duration (CVVD) device configured to control the operation of opening and closing an intake valve and an electronic throttle control (ETC) device configured to control the operation of opening and closing a throttle valve and adjusts the amount of air to be introduced into a combustion chamber.

Description of Related Art

In general, an internal combustion engine produces power by introducing fuel and air into a combustion chamber and combusting the fuel. to introduce air an intake valve is controlled by the operation of a cam shaft, and air is introduced into the combustion chamber while the intake valve is opened. In addition, an exhaust valve is controlled by the operation of a cam shaft, and air is discharged from the combustion chamber when the exhaust valve is opened.

In the present case, optimal operation of the intake and exhaust valves vary depending on the revolutions per minute (RPM) of the engine. That is, an appropriate timing to open or close the valve varies depending on the RPM of the engine.

To implement an appropriate valve operation in accordance with the RPM of the engine a continuous variable valve lift (CVVL) device is implemented wherein a cam for driving the valve is designed to have a plurality of shapes, or the valve is operated by different lifts in accordance with the RPM of the engine has been developed.

A continuous variable valve timing (CVVT) technology has been developed as a device configured for adjusting the opening time of the valve. The present technology simultaneously changes the timings of opening and closing the valve in a state in which the duration of the valve is fixed.

However, the CVVL or CVVT in the related art has a complicated configuration and high price. Korean Patent No. 10-1326818 "Continuous Variable Valve Duration Device", hereinafter referred to as a CVVD device. has been presented as a method of solving the above problem.

That is, an engine equipped with the CVVD device may actively control the duration (for reference, the term "duration" refers to an angle of a cam for opening and closing a valve or refers to the time while the valve is opened, but in the present specification, the term "duration" means the time while the valve is opened) of the intake valve, and or the exhaust valve, in accordance with an operating state of the engine. The configuration and principle of the CVVD device is public knowledge.

Most of the recently released engines for a vehicle are equipped with an electronic throttle control (ETC) device configured to electronically control the opening degree of a throttle valve in accordance with a driving mode and acceleration state; thereby electronically controlling the amount of air supplied required for the combustion in the chamber in accordance with an operating state of the engine.

Meanwhile, while a vehicle travels the control device of the engine may receive a request for torque reserve (e.g., in a case in which the vehicle enters an uphill road or an air conditioner is operated) which requires an increase in the torque of an engine, or receives a request for a torque reduction (e.g., in a case of the timing of shifting gears of a transmission or when a vehicle enters a downhill road) which requires a decrease in the torque of an engine.

In the related art, the ETC device is and configured to compensate for the torque of the engine. However, the control of the ETC device adjusts the air flow rate, and as a result there are problems wherein the responsiveness is relatively lowered and a loss of fuel economy is induced equivalent to the lowered responsiveness.

In another method, torque is reduced by changing the ignition timing in the combustion chamber to quickly reduce an engine torque value when a request for an instantaneous reduction in engine torque is made by a component such as the transmission or an electronic stability control (ESC) device. However, there is a problem when the ignition timing is changed from an optimal timing the engine efficiency is reduced and a loss of fuel economy occurs in a like manner.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method of controlling an engine, which is configured for rapidly compensating for engine torque (in comparison with a control operation through an ETC device in the related art) when a request for an increase or decrease in engine torque is made, and preventing or maximally inhibiting an unnecessary loss of fuel economy by utilizing a CVVD device and an ETC device.

Various aspects of the present invention are directed to providing a method of controlling an engine which has a CVVD device configured to have operation control of opening or closing an intake valve (in more detail, controls the timing to close the intake valve), and an ETC device configured to have operation control of opening or closing a throttle valve and adjusts the supply of air to be introduced into a combustion chamber. The present method includes determining whether it is necessary to increase or decrease engine torque; changing the duration of the intake valve by a CVVD device when an increase or decrease in engine torque is necessary (in more detail, advancing or retarding the timing to close the intake value compared to an original value); and adjusting the volume of air introduced controlled by the ETC device in a state in which the duration of the intake valve is changed (in a state in which the duration is changed and the volume in the combustion chamber becomes smaller or larger than an original volume).

The method may further include initializing, by the CVVD device, the duration of the intake valve when compensation for the engine torque is completed.

In the exemplary embodiment of the present invention determining whether it is necessary to increase or decrease the engine torque may include determining whether the engine torque has decreased by an external factor therefore an increase in engine torque is required (determining whether a request for torque reserve is made); and determining whether a decrease in engine torque is required by request from components connected to the engine (determining whether a request for a torque reduction is made).

The CVVD device may decrease the duration when an increase in engine torque is required so that a timing to close the intake valve is advanced compared to an original timing to close the intake valve. An increased electrical load or when an external disturbance is detected may be conditions to require an increase in engine torque.

The CVVD device may increase the duration when a decrease in engine torque is required so that the timing to close the intake valve is retarded compared to the original timing to close the intake valve. Whether a decrease in engine torque is required may be determined by receiving an electrical signal from power system devices to which the power of the engine is transmitted.

In an aspect of the present invention, the ETC device may be configured to adjust an air amount through proportional-integral-derivative (PID) control of a motor which rotates the throttle valve, and the CVVD device may control the amount of air supplied in conjunction with the change in duration.

The present invention, which has the aforementioned configurations, may prevent deterioration in fuel economy by compensating for torque with a higher responsiveness through the utilizing of a CVVD device and an ETC device instead of the method in the related art which controls only the ETC device or adjusts the ignition timing.

The methods and apparatuses of the present invention have other features and advantages which will be apparent from or are set forth in more detail in the accompanying drawings, which are incorporated herein and the following Detailed Description, which together serve to explain certain principles of the present invention.

Figure 1:
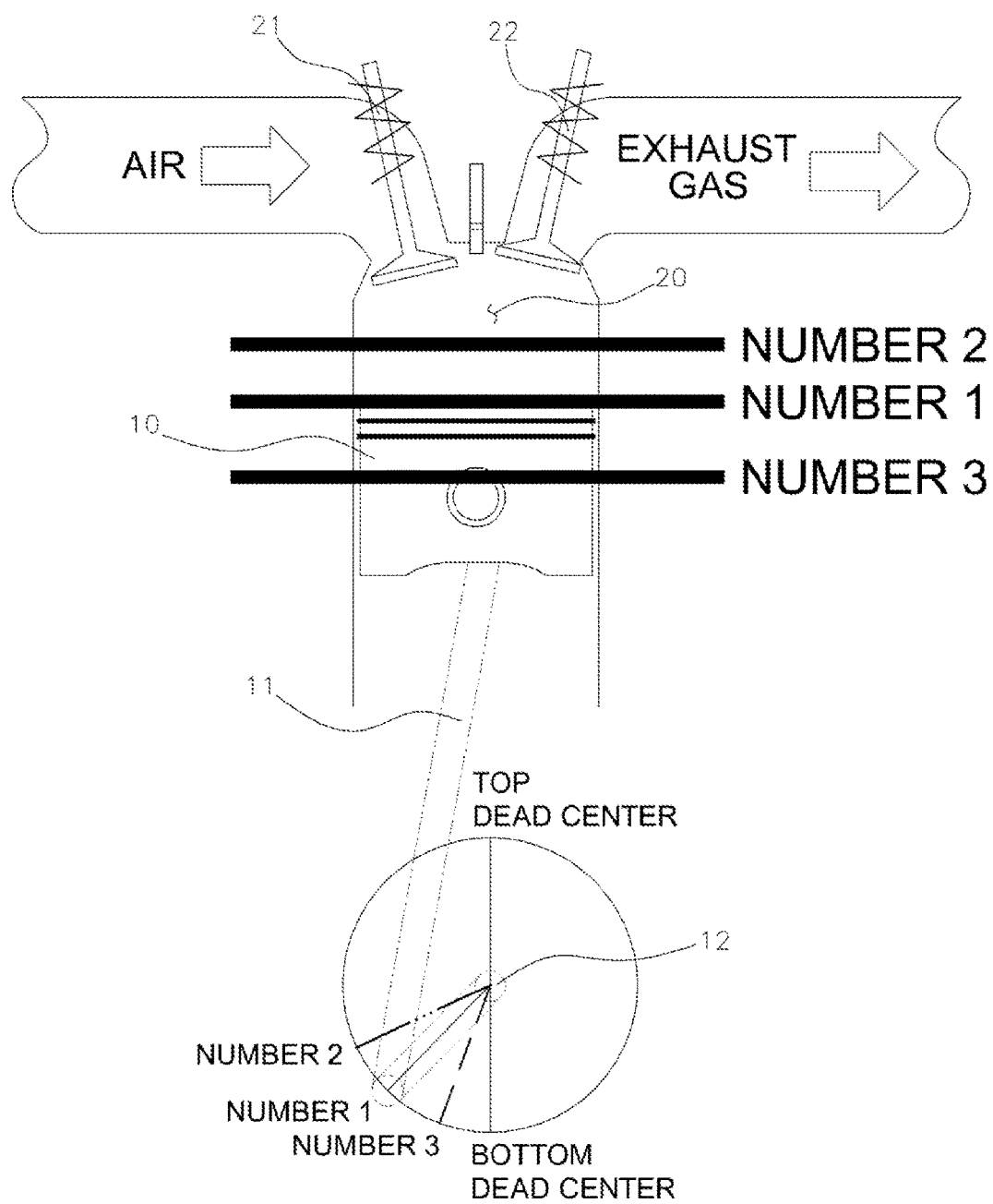
FIG. 1 is a view illustrating a cross-sectional shape of a combustion chamber of an engine.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention relates to a method of controlling an engine configured for achieving an improvement in fuel economy by quickly compensating and adjusting the torque of the engine in accordance with a request for an increase or decrease in torque. An engine according to an exemplary embodiment of the present invention has a CVVD device which may control the timing to open or close the intake valve 21, and the ETC device which electronically operationally controls the opening or closing of the throttle valve by determining an optimum amount of air to be introduced into a combustion chamber 20 as described above. Further, during the four strokes including intake, compression, power, and exhaust strokes, a piston 10 reciprocally moves upward and downward in the combustion chamber 20, and a connecting rod 11 connected to the piston 10 rotates a crank shaft 12 as illustrated in FIG. 1. In the present case, the intake valve 21 is opened during the intake stroke and the exhaust valve 22 is opened during the exhaust stroke; both the intake valve 21 and the exhaust valve 22 are closed during the compression and power strokes. The opening degree of each of the intake valve 21 and the exhaust valve 22 is adjusted by the rotation of a cam shaft connected to the crank shaft 12, and the CVVD device which is disposed in the vicinity of the cam shaft and includes a motor, position sensor, control shaft, and the like; having additional operational control of the opening or closing the intake valve 21 and the exhaust valve 22.

In an exemplary embodiment of the present invention, in a general state (i.e., in a state in which the CVVD device initializes a duration) the intake valve 21 is closed when the connecting rod 11 is at position number 1, and the ETC device is configured to appropriately supply air into the combustion chamber 20 before the intake valve 21 is closed after the exhaust valve 22 is closed.

In an exemplary embodiment of the present invention, the CVVD device may control the timing to open or close the intake valve 21, and thus may close the intake valve 21 slower (e.g., in a state in which the connecting rod 11 is placed at a number 2 position) or may close the intake valve 21 quicker (e.g., in a state in which the connecting rod 11 is at position number 3) in comparison with a state in which the operation to close the intake valve 21 is initialized (in the state in which the connecting rod 11 is placed at position number 1).

In the present case, because the state in which the connecting rod 11 is at position number 2 occurs after the piston 10 moves further upward (than the initialized state), the volume of the combustion chamber 20 is smaller than in the state in which the connecting rod 11 is at position number 1. On the contrary, because the state in which the connecting rod 11 is at position number 3 is a state before the piston 10 moves further upward (than the initialized state), the volume of the combustion chamber 20 is larger than in the state in which the connecting rod 11 is at position number 1.

Therefore, in the state in which the connecting rod 11 is at position number 2, the volume of the combustion chamber 20 is small, and as a result the amount of air which may be introduced is decreased. In the state in which the connecting rod 11 is at position number 3, the volume of the combustion chamber 20 is increased, and as a result the amount of air which may be introduced is increased. In the present case, before the intake valve 21 is closed the ETC device controls the throttle valve to appropriately supply air in accordance with the volume of the combustion chamber 20. In other words, the ETC device may supply a relatively smaller amount of air when the intake valve is closed at the number 2 position compared to when the intake valve is closed at the number 1 position, and may supply a relatively larger amount of air when the intake valve is closed at the number 3 position compared to when the intake valve is closed at the number 1 position.

Therefore, in comparison with the case in which the intake valve 21 is closed at the number 1 position, the torque of the engine may be instantaneously increased due to the increase in the amount of air which may be introduced into the combustion chamber 20 in the case in which the intake valve 21 is closed at the number 3 position, and the torque of the engine may be decreased due to the decrease in the amount of air which may be introduced into the combustion chamber 20 in the case in which the intake valve 21 is closed at the number 2 position.

Therefore, an engine, according to an exemplary embodiment of the present invention, may rapidly increase or decrease the engine torque by controlling the duration and adjusting the timing to close the intake valve 21 by controlling the CVVD device and ETC device.

The engine of the present invention may adjust the timing to close the intake valve 21 as described above, and may reduce fuel consumption through the control method to be described below.

The method of controlling an engine according to an exemplary embodiment of the present invention includes determining whether it is necessary to increase or decrease engine torque, changing by use of the CVVD device, a duration of the intake valve 21 when it is necessary to increase or decrease engine torque, and adjusting the amount of air introduced by the ETC device in a state in which the duration of the intake valve 21 is changed. In an exemplary embodiment of the present invention, the operation of changing the duration of the intake valve 21 as described above means an operation of advancing or retarding the timing to close the intake valve 21 compared to an original timing of closing the intake valve (i.e., the timing to close the intake valve 21 at the number 1 position). Therefore, in the state in which the duration is changed, the volume in the combustion chamber 20 becomes smaller or larger than the original volume.

Figure 2:
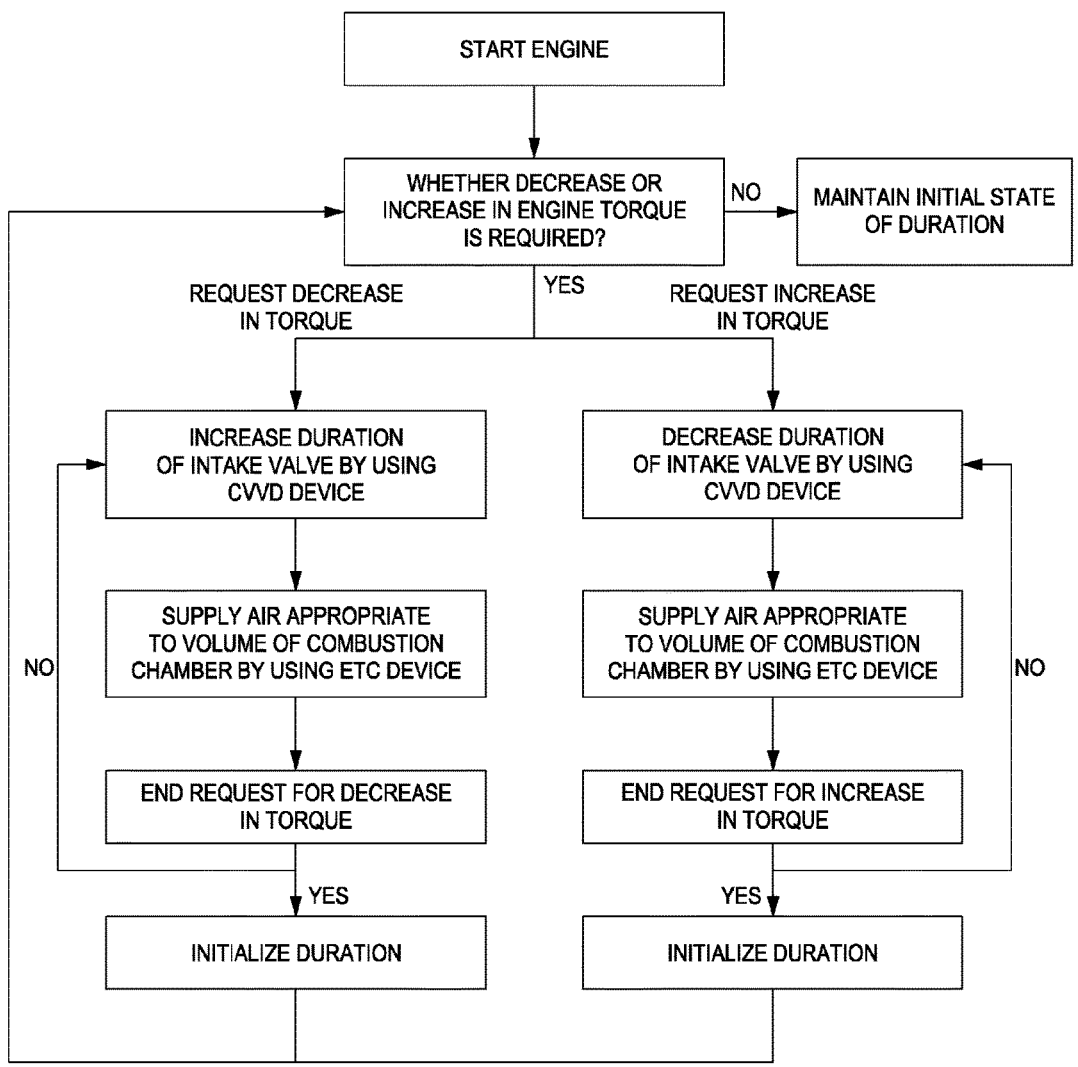
FIG. 2 is a flowchart illustrating, in a step-by-step manner, a method of controlling the engine according to an exemplary embodiment of the present invention.

In more detail, referring to FIG. 2, the control method of the present invention starts with determining whether it is necessary to decrease or increase engine torque by using an electric device, a sensor, or the like mounted in a vehicle body in a state in which the engine is initiated. In a case in which it is not necessary to increase or decrease torque, the CVVD device is not involved in opening or closing the intake valve 21, but maintains the state in which the intake valve 21 is closed at the number 1 position.

However, in a state in which a request for a reduction or increase in engine torque is made, the CVVD device and the ETC device are involved in the operation of the engine.

First, when a request for a reduction in torque is inputted (a request for a torque reduction is made); the CVVD device retards the timing to close the intake valve 21 and increases the duration (controls the intake valve so that the intake valve is closed at the number 2 position). Therefore, since the volume of the combustion chamber 20 is decreased, as described above, the ETC device supplies a relatively small amount of air wherein the torque generated by the engine is reduced.

In contrast, when a request for an increase in torque is inputted (a request for torque reserve is made); the CVVD device advances the timing to close the intake valve 21 and decreases the duration (controls the intake valve so that the intake valve is closed at the number 3 position). Therefore, since the volume of the combustion chamber 20 is increased, as described above, the ETC device supplies a relatively large amount of air wherein the torque generated by the engine is increased.

In the present case, whether a request for an increase or decrease in engine torque is made is continuously monitored and provided as feedback, and as a result, the state in which the duration is decreased or increased is maintained when a request for an increase or decrease in engine torque is made. Further, even while the state in which the duration is decreased or increased is maintained, the duration may also be minutely adjusted so that the duration may be additionally further decreased or increased in accordance with the amount of required torque that increases or decreases.

When the request for an increase or decrease in torque ends (the compensation for engine torque is completed), the CVVD device initializes the duration of the intake valve 21 so that the intake valve is closed at the number 1 position.

Meanwhile, in an exemplary embodiment of the present invention, determining whether a request for the torque reserve is made is performed in consideration of all situations including not only a torque reduction caused by an electrical load or disturbance, but also situations in which an air conditioner connected to the engine operates, the vehicle rapidly turns, or the vehicle travels on an uphill road. Determining whether a request for the torque reduction is made is also performed in consideration of all situations including a situation in which the gears of a transmission coupled to the engine are shifted or the vehicle travels on a downhill road.

For reference, in an exemplary embodiment of the present invention, the ETC device is configured to adjust an air amount through PID control of a motor that rotates the throttle valve, and the CVVD device controls the amount of air supplied in conjunction with the change in duration.

The present invention, which has the aforementioned configurations, may prevent a deterioration in fuel economy by compensating for torque with a higher responsiveness by utilizing the CVVD device and ETC device instead of a method in the related art that controls only the ETC device or adjusts the ignition timing.

For convenience in explanation and accurate definition in the appended claims, the terms "upper", "lower", "internal", "outer", "up", "down", "upwards", "downwards", "front", "rear", "back", "inside", "outside", "inwardly", "outwardly", "internal", "external", "forwards" and "backwards" are used to describe features of the exemplary embodiments with reference to the positions of such features as displayed in the figures.

The foregoing description specific exemplary embodiments of the present invention have been presented for purpose of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling an engine which has a continuous variable valve duration (CVVD) device that controls an operation of opening or closing an intake valve, and an electronic throttle control (ETC) device that is configured to control an operation of opening or closing a throttle valve and adjusts an air amount to be introduced into a combustion chamber, the method comprising:
   determining whether it is necessary to increase or decrease engine torque;
   changing a duration of the intake valve by using a Continuous Variable Valve Duration Device(CVVD) when it is necessary to increase or decrease the engine torque; and
   adjusting the air amount introduced through the ETC device in a state in which the duration of the intake valve is changed,
   wherein the determining of whether it is necessary to increase or decrease the engine torque includes:
      determining whether the engine torque is decreased by an eternal factor and an increase in the engine torque is required; and
      determining whether a decrease in the engine torque is required by a request by components connected to the engine;
   wherein the CVVD device decreases the duration when the increase in the engine torque is required and wherein a timing of closing the intake valve is advanced compared to an original timing of closing the intake valve; and
   wherein the CVVD device increases the duration when the decrease in the engine torque is required and wherein the timing of closing the intake valve is retarded compared to the original timing of closing the intake valve.

2. The method of claim 1, further comprising:
   initializing the duration of the intake valve when compensation for the engine torque is completed.

3. The method of claim 1, wherein when the increase in the engine torque is required is determined based on whether an electricity load occurs or whether an external disturbance is detected.

4. The method of claim 1, wherein when the decrease in the engine torque is required is determined by receiving an electrical signal of power system devices to which power of the engine is transmitted.

5. The method of claim 1, wherein the ETC device adjusts the air amount through a proportional-integral-derivative (PID) control of a motor that rotates the throttle valve.

* * * * *